United States Patent [19]

Morel et al.

[11] Patent Number: 4,575,793
[45] Date of Patent: Mar. 11, 1986

[54] PERSONAL-COMPUTER TO 3270 SYSTEM INTERFACING APPARATUS

[75] Inventors: Charles P. Morel, Los Altos; Taylor O. Gahr, Cupertino, both of Calif.

[73] Assignee: CXI, Inc., Palo Alto, Calif.

[21] Appl. No.: 524,859

[22] Filed: Aug. 19, 1983

[51] Int. Cl.[4] ............................................. G06F 3/00
[52] U.S. Cl. ............................................... 364/200
[58] Field of Search ... 364/200 MS File, 900 MS File

[56] References Cited

U.S. PATENT DOCUMENTS

| | | | |
|---|---|---|---|
| 4,079,455 | 3/1978 | Ozga | 364/200 |
| 4,167,779 | 9/1979 | Sullivan et al. | 364/200 |
| 4,257,096 | 3/1981 | McCullough et al. | 364/200 |
| 4,430,711 | 2/1984 | Anderson et al. | 364/200 |
| 4,498,135 | 2/1985 | Caudel | 364/200 |

Primary Examiner—Thomas M. Heckler
Attorney, Agent, or Firm—Thomas E. Schatzel

[57] ABSTRACT

Disclosed is an apparatus for interfacing a personal-computer to a 3274/6 compatible cluster controller of a 3270 type system, the apparatus employing a special high-speed processor.

10 Claims, 5 Drawing Figures

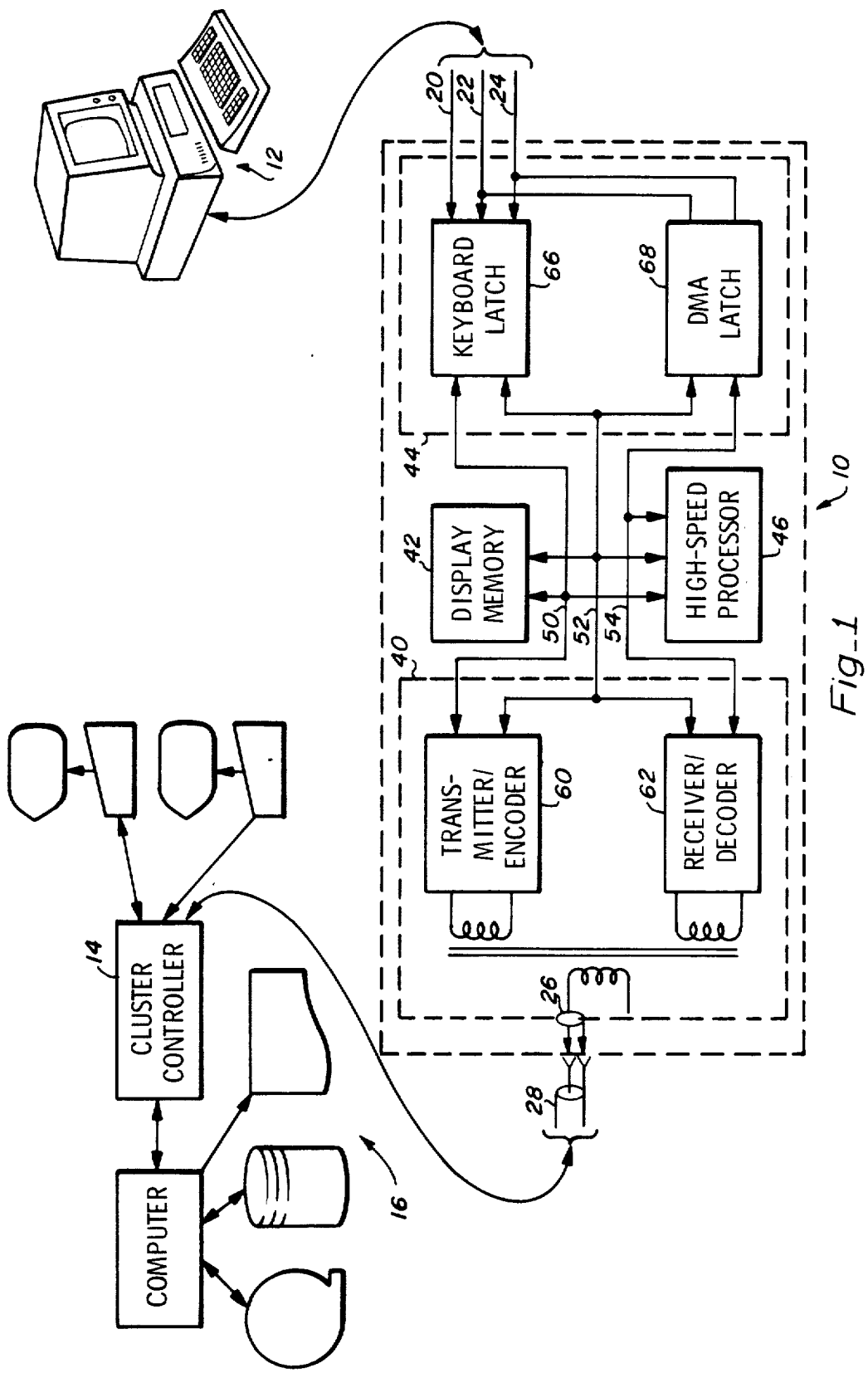
Fig_1

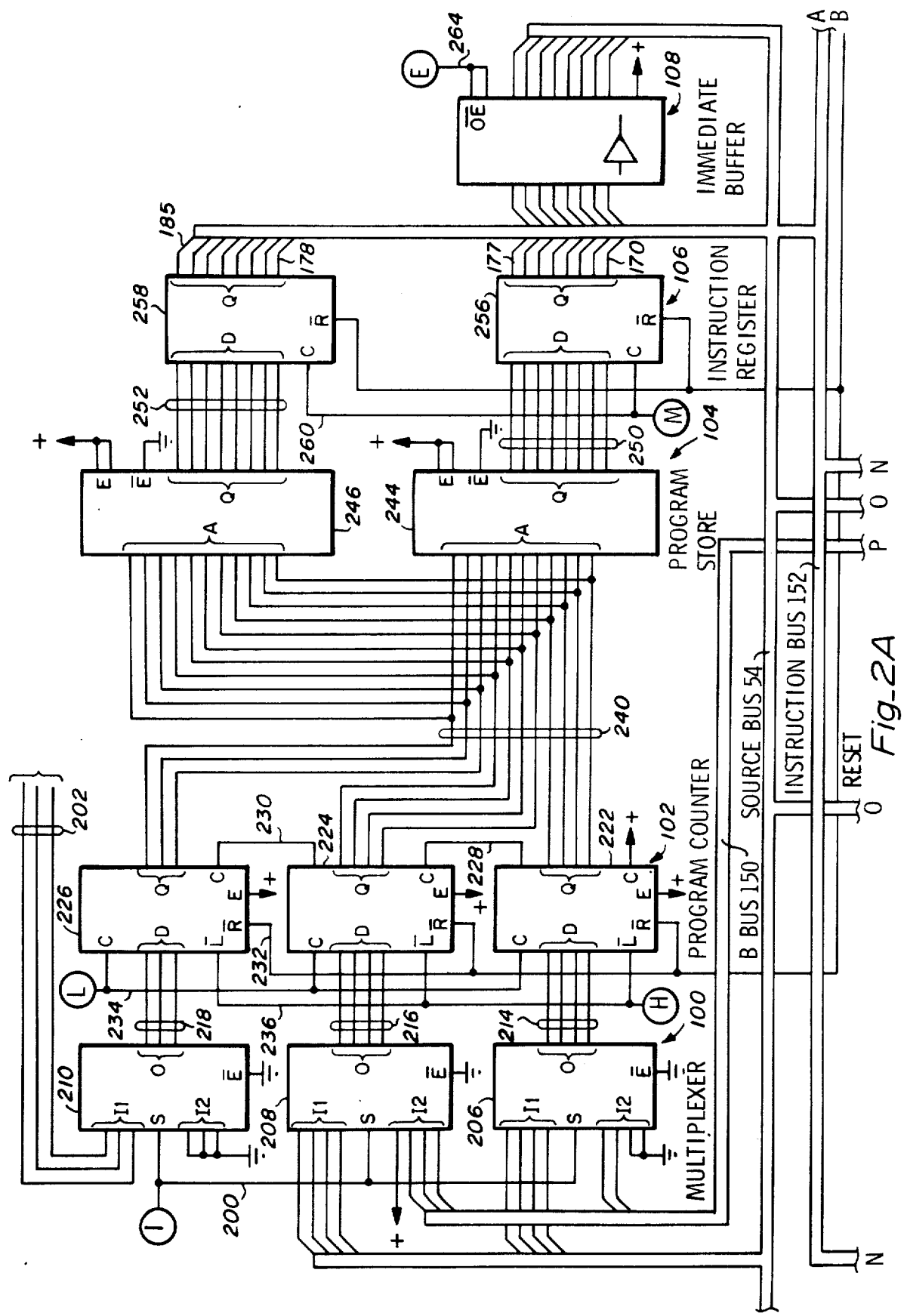

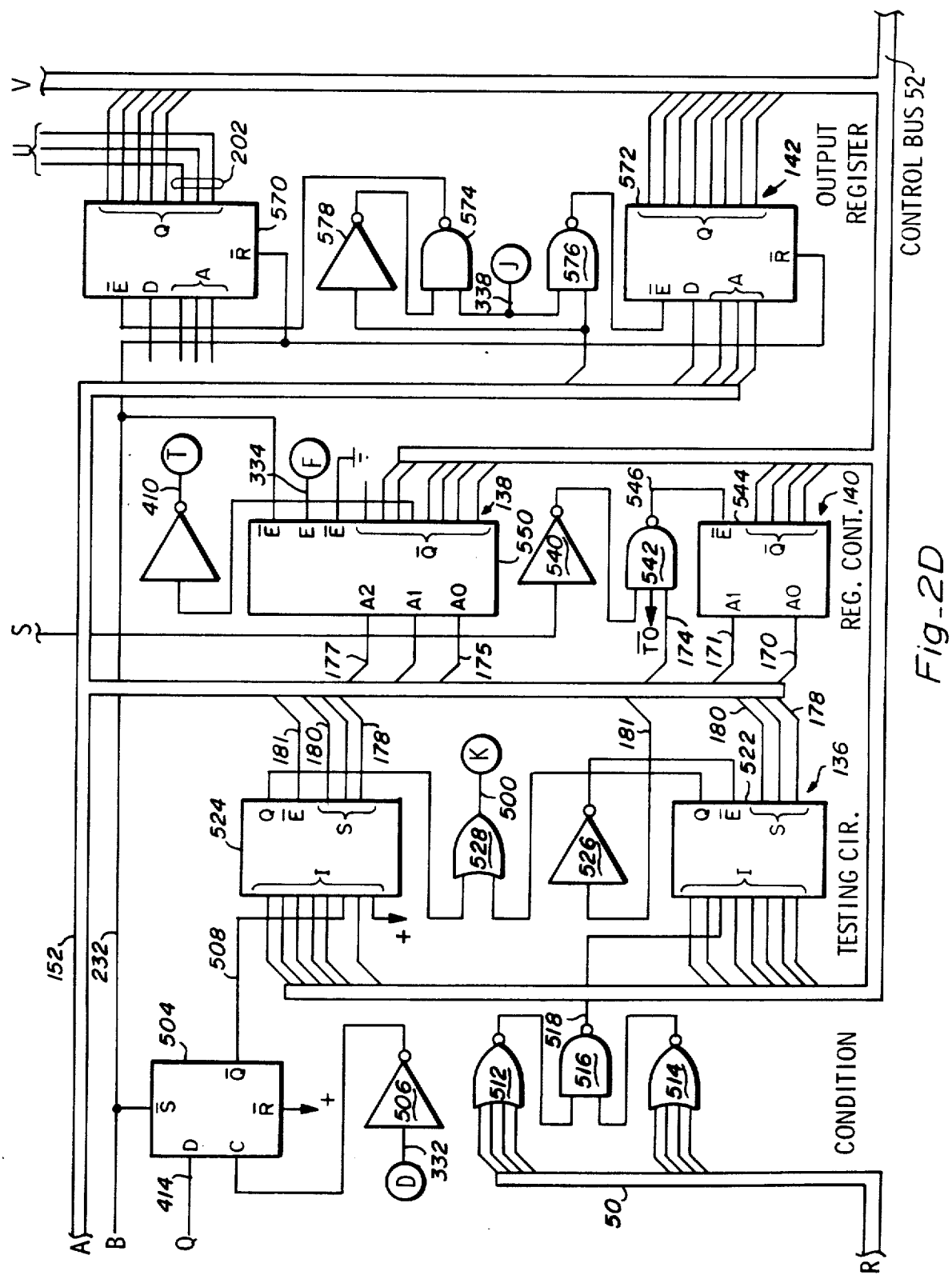
Fig_2D 4,575,793

PERSONAL-COMPUTER TO 3270 SYSTEM INTERFACING APPARATUS

BACKGROUND OF THE INVENTION

1. Field of the Invention

The present invention relates to personal-computers generally and more specifically to an apparatus for interfacing a personal-computer to an IBM 3274/6 compatible cluster controller of a 3270 system.

2. Description of the Prior Art

It is common practice to couple a number of terminals to a computer (host) to permit resource sharing. In what is commonly referred to as a 3270-type system, a main frame computer of the type that is commonly designated 370, 30XX or 43XX by the International Business Machines (IBM) Corporation is connected to one, or more, IBM 3274/6-type cluster controllers (control units) each of which is connected to a number of IBM 3278/9-type terminals (display stations). In such a system, controller-terminal communication is over a single-wire coaxial cable by means of a serial by bit, dipulse (biphase) format at a relatively high (2.3587 Megahertz bit) rate. (The protocols for controller-terminal interconnection and communication are discussed in the IBM document entitled "IBM 3274, 3276 Control Unit to Device Product Attachment Information".) Unfortunately, IBM 3278/9-type terminals (and terminals compatible therewith) are relatively expensive.

Personal-computers, such as, for example, those of the IBM-type (IBM PC), are gaining popularity as an alternative to the use of a terminal connected to a system of the above-mentioned type. Although providing considerable computing power, absent a connection to such a system, personal-computers are disadvantageous in that they are unable to provide many of the resources of such a system including the computing power of a main frame computer, the data base of the main frame computer and/or the system and the networking power of the system. (For a technical discussion of the IBM personal-computer the reader is referred to the IBM user manuals generally and particularly to the manual designated "Hardware Design and Interface Information 6025008.")

SUMMARY OF THE PRESENT INVENTION

It is therefore an object of the present invention to provide a relatively inexpensive apparatus for interfacing a personal computer to an IBM 3274/6 compatible cluster controller.

Another object of the present invention is to provide a processor of sufficient speed and economy to be suitable for use in interfacing a personal-computer to an IBM 3274/6 compatible cluster controller.

Briefly, the preferred embodiment of an apparatus for interfacing a personal-computer to an IBM 3274/6 compatible cluster controller employs a cluster-controller interface (40), a display memory (42), a personal-computer interface (44), and a high-speed processor (46), all interconnected by a destination bus (50), a control bus (52), and a source bus (54). The processor (46) has a multiplexer (100) for developing a jump address from source bus data, for developing another jump address from data on a B bus (150) and for selecting one of the jump addresses; a program counter (102) for developing an instruction address by incrementing the previous address or loading the selected jump address; a program store (104) for retrieving an instruction addressed by the program counter; an immediate buffer (108) for placing as data the immediate portion of each instruction (if any) on the source bus; circuitry (114) for decoding each instruction; circuitry (116) for developing machine cycle timing signals; an F register (stack) (122) for storing data placed on the destination bus and for placing stored data on the source bus; a B register (accumulator)(124) for storing (temporary and working result) data placed on the destination bus and for placing stored data on the B bus; an arithmetic logic unit (ALU) (128) for performing the operation specified by the instruction on the source bus data (operand) and on the B bus data (operand) to develop data (results) on the destination bus; circuitry (136) for testing a (processor external)(hardware) condition for (direct) jump on condition (to an indirect address) instructions; a destination bus control register (138); a source bus control register (140); and an output (processor external hardware control) register (142).

The present invention is advantageous in that it permits a personal-computer to be economically interfaced to an IBM 3274/6 compatible cluster controller.

Another advantage of the present invention is that it permits the construction of economical high-speed processors.

These and other objects and advantages of the present invention will no doubt become apparent to those skilled in the art after reading the following detailed description of the preferred embodiment which is illustrated in the several figures of the drawing.

IN THE DRAWING

FIG. 1 is a combined block diagram and perspective view of a personal-computer to IBM 3274/6 compatible cluster controller interfacing apparatus in accordance with the present invention; and FIGS. 2A–2D are block diagrams further illustrating the high-speed processor shown in FIG. 1.

DETAILED DESCRIPTION OF THE PREFERRED EMBODIMENT

Figure 2B:
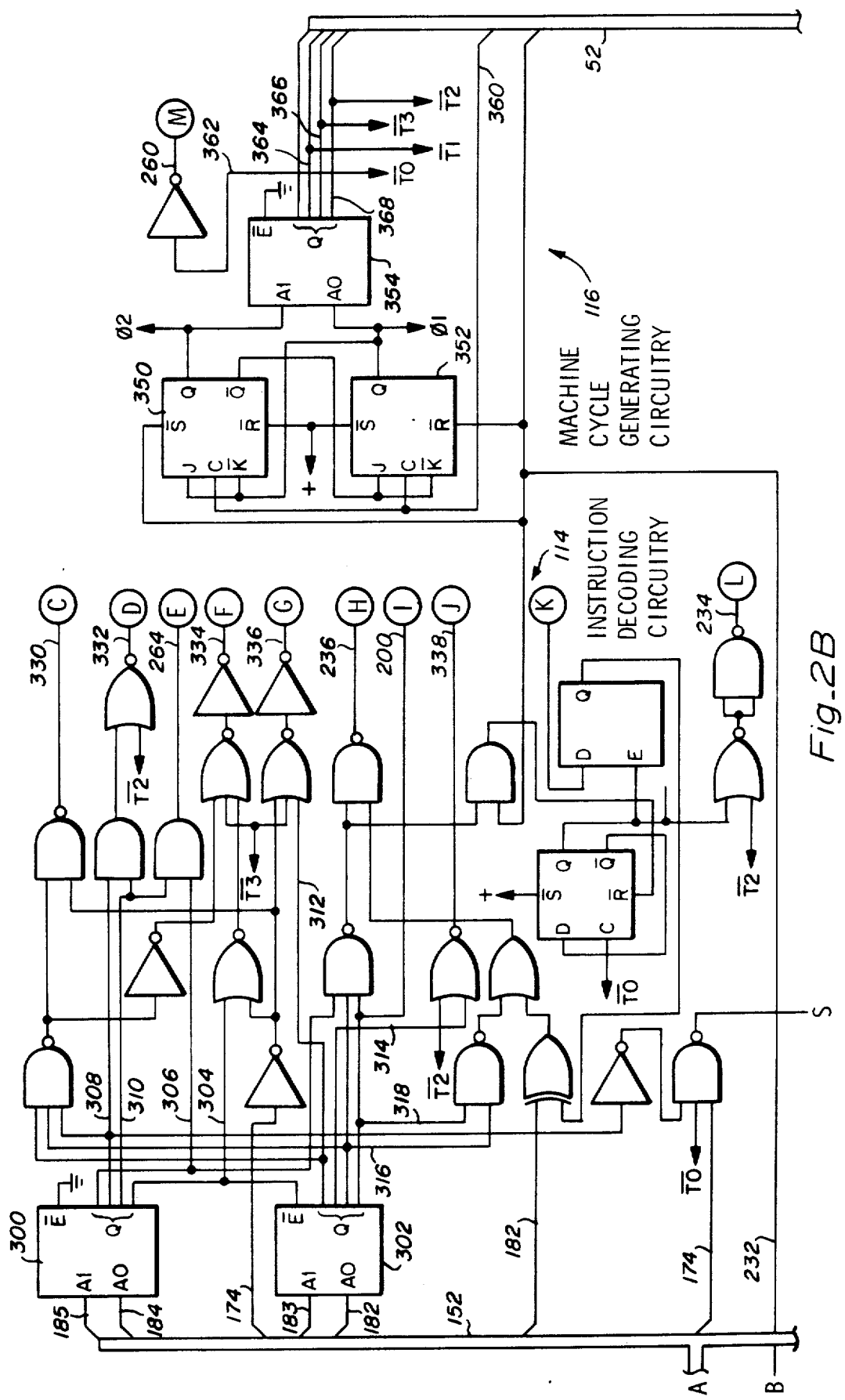

Illustrated in FIG. 1 of the drawing generally designated by the number 10 is the preferred embodiment in accordance with the present invention of an apparatus for interfacing a personal-computer, such as, for example, the IBM-type personal-computer illustrated at 12, to an IBM 3274/6 compatible cluster controller of a 3270 system, the cluster controller being designated 14 and the system being generally designated 16. Preferably, the components of apparatus 10 are interconnected by means of a printed circuit board of suitable configuration for disposition within the personal-computer, computer 12, within an expansion slot (connector) to access the computer's address, data and control buses, respectively designated 20, 22 and 24. Additionally, apparatus 10 has a connector 26 for connection by a coaxial cable 28 to cluster controller 14.

Apparatus 10 includes as principal components a cluster controller interface 40, a display memory 42, a personal-computer interface 44 and a high-speed processor 46 all interconnected by an 8-line destination bus 50, a control bus 52 and an 8-line source bus 54.

Interface 40 has a portion 60 which is responsive to signals developed on control bus 52 and operative to encode in IBM 3270 serial-bit format the byte of data represented by signals developed in parallel format on the eight lines of destination bus 50 and to develop a signal representing the encoded bits for transmission over coaxial cable 28 to cluster controller 14. Additionally, interface 40 has a portion 62 for receiving from cluster controller 14 by way of coaxial cable 28 a signal representing bits encoded in IBM 3270 serial-bit format, the portion being operative to decode the bit signal to develop corresponding data bytes, and, responsive to signals developed on control bus 54, operative to develop on the eight lines of source bus 54, signals representing in parallel format the current data byte.

Preferably, interface 40 employs a pulse transformer and three devices, respectively designated DP8340, DP8341 and DS3487 by the National Semiconductor Corporation, all configured substantially as suggested in the data sheets published by the National Semiconductor Corporation for the DP8340 and DP8341 devices. Additionally, interface 40 employs an inverter (circuit) of the type that forms one circuit of the several circuits integrated in a device of the type which is commonly designated 74LS04 of the 7400 low-power Schottky TTL series. The inverter is employed to develop an (active-high) signal for enabling the data output of the DP8341 device from an (active-low) signal developed on a line of control bus 52 for reading the device register. Further, interface 40 employs a pair of D-type flip-flop (circuits) of the type that are collectively integrated in a device of the type commonly designated 74LS74. Each of the flip-flops is employed to latch the (binary) state of the signal developed at a respective one of the D10 and D11 DP8341 device outputs to develop a (latched) signal for driving a respective one of two lines of control bus 52, the flip-flops being latched responsive to the signal used for reading the DP8341 register. An 18.87 Megahertz signal developed by the DP8340 device is used to drive a line of control bus 52 to serve as an apparatus 10 master clocking signal.

Display memory 42 provides a repository (double buffer) for data (characters) transmitted by cluster controller 14 for updating the visual display generated by the personal-computer, computer 12, to permit the task of receiving the data from the cluster controller to be separated from the task of updating the personal-computer display memory. Additionally, memory 12 provides processor 46 convenient access to the data used in generating the visual display.

Preferably, for this purpose, memory 42 employs (three or) four random access memory (RAM) devices of the type commonly designated 6116. Each of the 11 address inputs of each of the four RAM devices is connected to a respective one of the 11 lowest order lines of a 13-line, memory 12 internal, address bus; and, each of the eight data inputs/outputs of each of the four RAM devices is connected to a respective one of the lines of an 8-line, memory 12 internal, data bus.

A pair of devices of the type commonly designated 74LS273 (octal latch) are employed for latching the (binary) state of the signals developed on destination bus 50 to develop signals for driving the memory 12 internal address bus. Each of the eight data inputs of one of the 74LS273 devices (a device referred to as the low (L) address register) is connected to a respective one of the eight lines of destination bus 50; and, the eight data outputs of the device are connected each to a respective one of the eight lowest order lines of the memory 12 internal, address bus. Five of the data inputs of the other 74LS273 device (a device referred to as the high (H) address register) are connected each to a respective one (orderwise) of the five lowest order lines of destination bus 50; and, the corresponding five data outputs of the device are connected each to a respective one (orderwise) of the five highest order lines of the memory 12 internal, address bus. The (active-low) reset input of each of the 74LS273 devices is connected to a line of control bus 52 on which an (active-low) apparatus 12 master resetting signal is developed. The latch (clock) input of each of the 74LS273 devices is driven responsive to a signal developed on a respective one of two lines of control bus 52, each of the lines being coupled to the respective input by a respective one of two inverter (circuits) of the type which (with other inverter circuits) are integrated in a device of the type commonly designated 74LS04. Each of the two lowest order lines of the memory 42 internal, address bus is connected to a respective one of the two inputs of a 74LS32 2-input OR gate (circuit), the output of which is connected to a line of control bus 52.

A device of the type commonly designated 74LS139 (2-to-4 line decoder/demultiplexer) is employed for RAM device selection. The two decode/multiplex inputs of the 74LS139 device are each connected to a respective (orderwise) one of the two highest order lines of the memory 12 internal, address bus; and, each of the four device (active-low) outputs is connected to the (active-low) chip select input of a respective one of the four RAM devices. The (active-low) enable input of the 74LS139 device is connected to a low logic level potential (circuit ground). The (active-low) output-enable input of each of the RAM devices is connected to a (single) line of control bus 52.

A 74LS74 type flip-flop (circuit) is employed for developing an (active-low) RAM device writing signal. The (active-low) set input of the flip-flop is connected to a high logic level potential (+5 volts); and, the flip-flop (active-low) reset and (active-high) data inputs are connected to the control bus 50 line on which the apparatus 10 master resetting signal is developed. The clock input of the flip-flop is connected to the control bus 50 line on which the apparatus 10 master clocking signal is developed; and, the flip-flop inverted data output is connected to the (active-low) write input of each of the four RAM devices.

Finally, a pair of devices of the type commonly designated 74LS244 (octal tri-state drivers) are employed, one being connected to selectively develop on each of the eight lines of the memory 42 internal, data bus a signal which corresponds in (binary) state with that of a signal developed on a respective one of the eight lines of destination bus 50 and the other being connected to selectively develop on each of the eight lines of source bus 50 a signal which corresponds in state with that of a signal developed on a respective one of the eight lines of the internal data bus. The two output-enable inputs of the former 74LS244 device are connected to the memory 42 flip-flop inverted data output; and, the two output-enable inputs of the latter 74LS244 device are connected to a line of control bus 52.

Personal-computer interface 44 has a portion 66 for receiving from the personal-computer, computer 12, a byte of data identifying a computer keyboard key closure, the portion being operative to latch the state of signals developed by the computer on computer data bus 22 at each of the times identified by computer control bus 24 signals and, responsive to signals developed on apparatus 10 control bus 52, being operative to develop on the eight lines of source bus 54 signals representing the current latched signal states. Additionally, interface 44 has a portion 68 for providing the personal-computer, computer 12, a byte of data for use by the computer in updating its visual display memory, the portion being operative to latch the state of each of the signals developed on the eight lines of destination bus 50 at each of the times identified by an apparatus 10 control bus 52 line signal and, responsive to signals developed by the personal-computer on computer control bus 24, being operative to develop on computer data bus 22 signals representing the current latched signal states.

Preferably, keyboard data byte latching portion 66 employed a device of the type commonly designated 74LS244 (octal driver), a device of the type commonly designated 74LS273 (octal latch) for latching the state of signals representing a nibble (4-bits) of personal-computer, computer 12, developed control data, a device of the type commonly designated 74LS374 (octal tri-state latch)(K register) for latching signals representing the byte of keyboard data developed by the computer and circuitry for address decoding. The 74LS244 device develops on a portion 66 internal, data bus buffered signals representing those developed on the personal-computer, computer 12, data bus (bus 22). For this purpose, each of the eight data inputs of the 74LS244 device is connected to a respective one of the eight lines forming bus 22; and, each of the eight data outputs of the device is connected to a respective one of eight lines forming the portion 66 internal, data bus. The two (active-low) enable inputs of the 74LS244 device are connected to a low logic level potential (circuit ground).

Four of the data inputs of the 74LS273 device are connected each to a respective one of the four lowest order lines of the portion 66 internal, data bus; and, the three highest order data outputs of the four corresponding data outputs of the device are connected each to a respective one of three lines of control bus 52. The other data output of the 74LS273 device is connected to one input of a 74LS00 type 2-input NAND gate (circuit). The other input of the NAND gate is connected to the reset input of the 74LS273 device; and, the output of the NAND gate is connected to a 74LS04 type inverter (circuit) which develops the apparatus 10 resetting signal used to drive the respective line of control bus 52. A signal for driving the (active-low) reset input of the 74LS273 device is developed by a 74LS04 type inverter (circuit) from a reset signal developed on personal-computer, computer 12, control bus 24.

Each of the eight data inputs of the 74LS374 device is connected to a respective one of the portion 66 internal, data bus; and, each of the eight data outputs of the device is connected to a respective one of the eight lines of source bus 54. The output-enable input of the 74LS374 device is connected to a line of control bus 52.

The address decoding circuitry of interface 44 portion 66 is responsive to signals developed by the personal-computer, computer 12, to develop signals for latching (clocking) the 74LS273 and 74LS374 devices. When employed with a personal-computer of the IBM type (IBM PC), portion 66 is, preferably, responsive to signals developed by the personal-computer, computer 12, when the computer executes an output instruction which specifies a preselected one of the two (control) ports commonly designated 2EE and 3EE and operative to develop the 74LS273 device latching signal. Further, the circuitry is responsive to the signals developed when an output instruction which specifies a preselected one of the two (keyboard) ports commonly designated 2EF and 3EF is executed and is operative to develop a signal for latching the 74LS374 device.

Specifically, the latch (clock) input of the 74LS273 device is connected to the output of a first 74LS00 type 2-input NAND gate (circuit) a first input of which is coupled by a 74LS04 type inverter to the lowest order address line (the line commonly designated A0) of personal-computer, computer 12, address bus 20. The second input of the first NAND gate is coupled by a 74LS04 type inverter to the output of a first 74LS32 type 2-input OR gate one input of which is connected to the output of a second 74LS32 type 2-input OR gate the inputs of which are connected each to a respective one of the (active-high and active-low) lines of the personal-computer control bus 24 that are commonly designated address enable and input/output write. The other input of the first NOR gate is connected to the output of a third 74LS32 type 2-input OR gate one input of which is connected to the personal-computer address bus (bus 20) line commonly designated A4. The other input of the third OR gate is connected to the output of a 74LS30 type 8-input NAND gate seven of the eight inputs of which are connected each to a respective one of the personal computer address bus (bus 20) lines commonly designated A1, A2, A3, A5, A6, A7 and A9. The eighth input of the 74LS30 type NAND gate is connected to the output of a preselected (by jumper) one of a pair of 74LS04 type inverters which are connected in series and which are driven by the signal developed on the personal-computer address bus (bus 20) line commonly designated A8. The latch (clock) input of the 74LS374 device is connected to the output of a second 74LS00 type 2-input NAND gate. The first input of the second NAND gate is coupled to the first input of the first NAND gate by a 74LS04 type inverter; and, the second input of the second NAND gate is connected to the second input of the first NAND gate. Finally, a 74LS74 type flip-flop is employed, the data and (active-low) set inputs of which are connected to a high logic level potential; the clock input of which is connected to the output of the second NAND gate; the data output of which is connected to a line of control bus 52; and, the (active-low) reset input of which is coupled by a 74LS04 type inverter to the output of a 74LS00 type 2-input NAND gate having one input connected to the output/enable input of the 74LS374 device and having the other input connected to the line of control bus 52 on which the apparatus 10 master resetting signal is developed.

Preferably, DMA latching portion 68 (of interface 44) employs a device of the type commonly designated 74LS374 for latching the signals representing the data byte. Additionally, portion 68 employs control circuitry that includes a first and a second 74LS32 type 2-input OR gate, a 74LS04 type inverter and a first and a second 74LS109 type J-K flip-flop. Each of the eight data inputs of the 74LS374 device is connected to a respective one of the eight lines of designation bus 50; and, the eight data outputs of the device are connected each to a respective one of the eight lines forming personal-computer, computer 12, data bus 22. The latch (clock) input of the 74LS374 device is connected to the output of the inverter the input of which is connected to a line of control bus 24; and, the (active-low) output-enable input of the 74LS374 device is connected to the output of the first OR gate. The two inputs of the first OR gate are connected one to the (active-low) line of personal-computer, computer 12, control bus 24 commonly designated input/output request and the second to a preselected one (by jumper) of the two computer control lines commonly designated data acknowledge one and data acknowledge two.

The J, (active-low) K and (active-low) set inputs of the first flip-flop are connected to a high logic level potential. The clock input of the first flip-flop is connected to the output of the inverter; and, the inverted data output and (active-low) reset input of the flip-flop are connected to the (active-low) set input of the second flip-flop. The J and (active-low) K inputs of the second flip-flop are connected to a low logic level potential (circuit ground); and, the (active-low) reset input of the flip-flop is connected to the line of control bus 52 upon which the apparatus 10 master resetting signal is developed. The data output of the second flip-flop is connected both to a line of control bus 52 and a pre-selected one (by jumper) of personal-computer, computer 12, control bus 24 lines commonly designated data request one and data request three. Finally, the clock input of the flip-flop is connected to the output of the second OR gate one input of which is connected to the second input of the first OR gate and the other input of which is connected to the (active-low) line of personal-computer, computer 12, control bus 24 commonly designated memory write.

The operation of the various components of apparatus 10 is controlled by high-speed processor 46 which is illustrated in detail in FIGS. 2A-2D of the drawing. Processor 46 is shown to include as principal components a jump address multiplexer, illustrated in FIG. 2A generally designated 100, a program counter, generally designated 102, a (micro-code) program instruction store, generally designated 104, an instruction register, generally designated 106, an immediate instruction buffer 108, instruction decoding circuitry, illustrated in FIG. 2B generally designated 114, machine cycle generating circuitry, generally designated 116, an (F) register (stack), illustrated in FIG. 2C generally designated 122, a working (B) register (accumulator) 124, an arithmetic logic unit (ALU), generally designated 128, a temporary (T) register 130, condition testing circuitry, illustrated in FIG. 2D, generally designated 136, a destination-bus-control register, generally designated 138, a source-bus-control register, generally designated 140, and an output register, generally designated 142, the components being interconnected by destination bus 50, control bus 52, source bus 54, an 8-line B bus 150, and a 16-line instruction bus 152.

Multiplexer 100, illustrated in FIG. 2A, develops two 11-bit jump addresses. The 11 bits of one of the addresses are represented each by the (binary) state of the signal developed on a corresponding ond of 11 lines which include, for lower order bits, the eight lines of source bus 50 and, for higher order bits, three lines collectively designated 202. The other 11 bit address is, preferably, derived from the five bits represented each by the (binary) state of the signal developed on a corresponding one of five of the eight lines of B bus 150. Responsive to a signal developed on a line 200, multiplexer 100 is operative to select one of the two jump addresses.

Preferably, for this purpose, multiplexer 100 has three 74LS157 type devices (quad 2-to-1 line selectors/multiplexers), respectively designated herein 206, 208 and 210. The select input of each of devices 206, 208 and 210 is connected to line 200; and, the (active-low) enable (strobe) input of each of the devices is connected to a low logic potential (circuit ground). The four data (Y) outputs of device 206 are connected each to a respective one of four lines collectively designated 214. The two highest order data inputs of the four inputs of device 214 which are selected when a low logic level potential is developed on line 200 (A inputs) are connected each to a respective one of the two lowest order lines of B bus 150, the other two device 206 selected inputs being connected to a low logic potential. The other four data inputs of device 206 (B inputs) are connected each to a respective one of the four lowest order lines of source bus 54. The four outputs of device 208 are connected each to a respective one of four lines collectively designated 216. The three lowest order inputs of the four inputs of device 206 that are selected when a low logic level potential is developed on line 200 are connected to a respective one (orderwise) of the three highest order lines of the five lowest order lines of B bus 150, the remaining device 206 selected input being connected to a high logic level potential. The other four data inputs of device 208 are connected each to a respective one (orderwise) of the four highest order lines of source bus 54. Finally, three of the four outputs of device 210 are connected each to a respective one of three lines collectively designated 218; the corresponding three data inputs of the device which are selected when a low logic level potential is developed on line 200 are connected to a low logic level potential; and, the three corresponding data inputs which are not selected by such a potential are each connected to a respective one of the three lines collectively designated 202.

Program counter 102 develops a series of (micro-code) program instruction addresses, each by incrementing the previous address or by setting the address to the multiplexer 100 selected jump address. Preferably, program counter 102 has three 74LS161 type devices (synchronoush counters), designated therein 122, 124 and 126, connected in cascade to form an 11-bit (12-bit) counter for developing 11 bit instruction addresses. The carry output of device 122 is connected by a line 128 to an enable input of device 124 the carry output of which is connected by a line 130 to an enable input of device 126. The other enable inputs of devices 122, 124 and 126 are connected to a high logic level potential; and, the (active-low) reset input of each of the devices is connected to the line of control bus 52 upon which the apparatus 10 master resetting signal is developed, the line being designated 232. For incrementing the previous instruction address, the clock input of each of the devices (222, 224 and 226) is connected to a line 234; and, for setting the address to the selected jump address, the (active-low) parallel load input of each of the devices is connected to a line 236. The four data inputs of device 222, the four data inputs of device 224 and the three data inputs of device 226 are connected each to a respective one of the 11 lines collectively designated 214, 216 and 218; and, the corresponding 11 data outputs of the device are connected each to a respective one of 11 lines collectively designated 240.

Program store 140 stores a plurality of (micro-code) program instructions, retrieving the addressed one of the instructions. Preferably, program store 140 has two programmable read-only memory (PROM) devices of the type which are commonly designated TBP28S166 and which are designated herein 244 and 246. Each of the address inputs of each of devices 244 and 246 is connected to a respective one of the 11 lines collectively designated 240. The data output lines of device 244 are connected each to a respective one of eight lines collectively designated 250; and, those of device 246 are connected each to a respective one of eight lines collectively designated 252.

Preferably, instruction register 106 has a pair of 74LS273 type devices, designated herein 256 and 258, connected to latch the state of each of the signals developed on the lines collectively designated 250 and 252, responsive to a latching (clocking) signal developed on a line 260, and to develop on each of the 16 lines of instruction bus 152 a signal having a respective one of the latched states. The 16 lines of instructions bus 152 are designated, in ascending order, 170-185.

Buffer 108, which, preferably, has a device of the type generally designated 74LS244, develops on each of the eight lines of source bus 54 a signal which has a state that corresponds to the state of the signal developed on a corresponding one of the eight lowest order lines of instruction bus 152 responsive to an (active-low) output enabling signal developed on a line 264.

Preferably, instruction decoding circuitry 114, illustrated in FIG. 2B, has a pair of 74LS139 type devices (2-to-4 line decoders/demultiplexers), designated herein 300 and 302. The two select inputs of device 300 are connected each to a respective one of the two highest order lines of instruction bus 152 (lines designated 174 and 175); and, the two select inputs of device 302 are connected each to a respective one of the next two higher order lines of the instruction bus (lines which are designated 172 and 173). The enable input of device 300 is connected to a low logic level potential; and, the enable input of device 302 is connected to a line 304. Device 300 is operative to develop a low logic level potential on a line 306 when the respective potential levels developed on lines 176 and 175 are both low (00), as is the case for jump instructions; on a line 308 when the levels are low and high (01) for ALU instructions; on a line 310 when the levels are high and low (10) for immediate instructions; and on line 304 when the levels are both high (11) for register instructions. When a low logic level potential is developed on line 304, for register instructions, device 302 is operative to develop a low logic level potential on a line 312 when the respective potential levels developed on line 174 and 173 are both low (00) for T register to a designated register instructions; on a line 314 when the levels are low and high (01) for bit register instructions; on a line 316 when the levels are high and low (10) for vectored return instructions; and on a line 318 when the levels are both high (11) for conditional vectored jump instructions.

Additionally, instruction decoding circuitry 114 has a pair of flip-flops and a number of inverters and gates all of the 7400 low-power Schottky TTL type connected to develop processor 46 controlling signals including: an (active-low) F register 122 output enabling signal on a line 330; a T register 130 latching signal on a line 332; an (active-low) immediate buffer 208 output enabling signal on line 264; an (active-low) destination register control enabling signal on a line 334; an (active-low) S register 122 write enabling signal on a line 336; an (active-low) program counter 102 (jump) loading (setting) signal on line 236; a multiplexer 100 jump address selecting signal on line 200, an output bit register 142 loading signal on a line 338, and a program counter 102 clocking signal on line 234.

Preferably, machine cycle generating circuitry 116 has a pair of 74LS109 type flip-flops, designated herein 350 and 352, and a 74LS109 type device (2-to-4 line decoder/demultiplexer), designated herein 354. Flip-flops 350 and 352 and device 354 are connected to respond to the apparatus 10 master clocking signal developed by interface 10 on the respective line, designated 360, of control bus 52, to develop on four lines of the control bus (active-low) signals defining the four machine cycles which comprise each instruction period of processor 46 including a T0 "bar" signal on a line 362, a T1 "bar" signal on a line 364, a T2 "bar" signal on a line 366, and a T3 "bar" signal on a line 368.

Figure 2C:
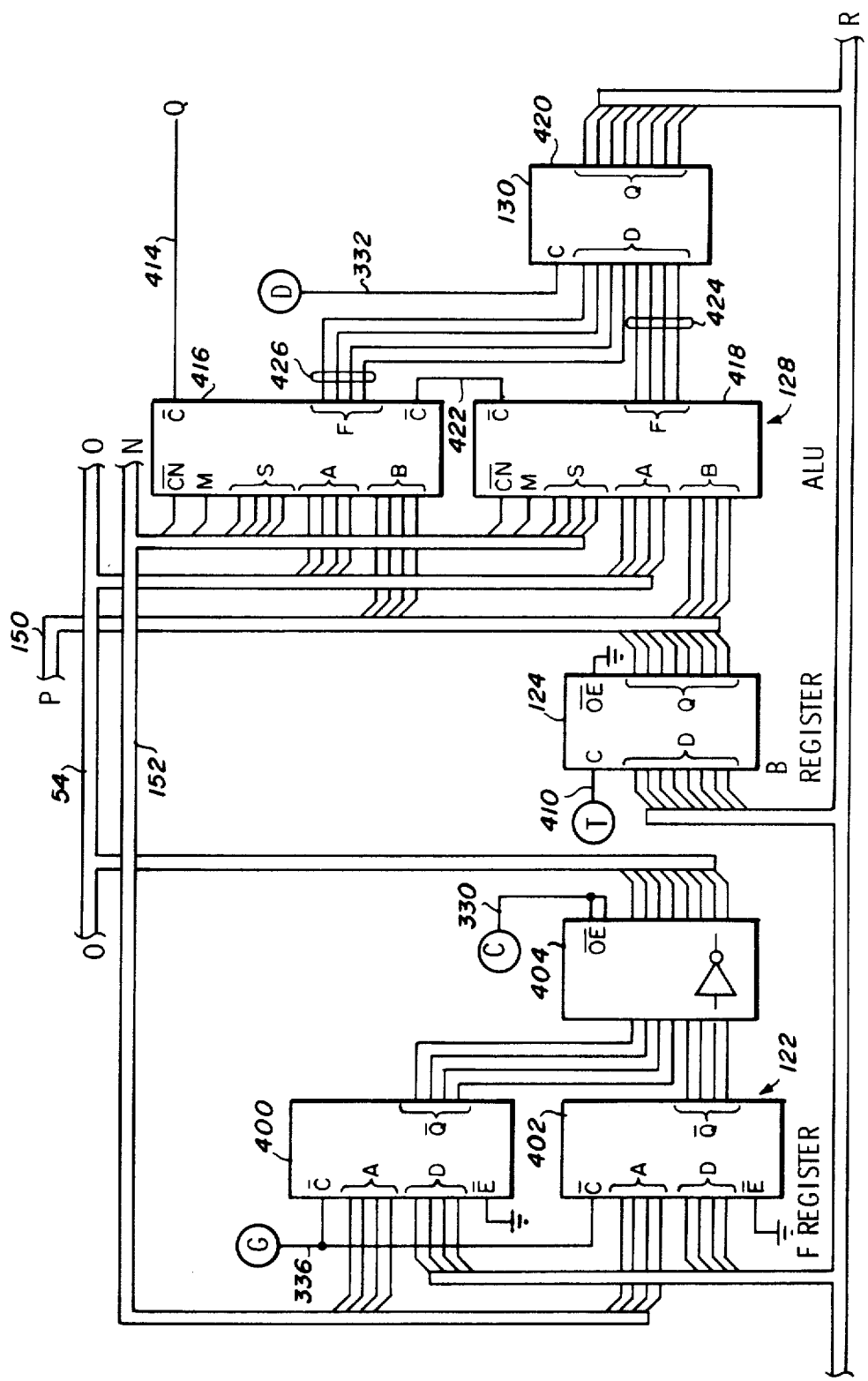

Preferably, F register (stack) 122, illustrated in FIG. 2C, has a pair of devices of the type commonly designated 74LS189, designated herein 400 and 402, and a device of the 74LS240 type, designated herein 404. Devices 400, 402 and 404 are connected to latch in a stack register addressed by the signals developed on the four lowest order lines of instruction bus 152 the state of each of the signals developed on the eight lines of destination bus 50 at the time designated by the (active-low) F register latching (write enabling) signal developed on line 336 and to develop on the eight lines of source bus 54 signals each having a respective one of the states latched in the stack register addressed by the bus 152 signals when enabled by the (active-low) output enabling signal developed on line 330.

B register (accumulator) 124, preferably, has a 74LS374 type device connected to latch the state of each of the signals developed on the eight lines of destination bus 50 at the time designated by the latching signal developed on a line 410 and to develop on the eight lines of B bus 150 signals each having a resepctive one of the latched states.

Arithmetic logic unit (ALU) 128 performs the arithmetic or logic operation selected by the signals developed on instruction bus 152 on the byte of data (A operand) represented by signals developed on source bus 152 and on the byte of data (B operand) represented by signals developed on B bus 150 to develop as a result a byte of data represented by signals developed on destination bus 50 and a signal on a line 414 representing a resultant inverse carry.

Preferably, ALU 128 has a pair of 74LS181 type devices, designated herein 416 and 418, and a 74LS373 type device, designated herein 420. The inputs commonly designated S0, S1, S2 and S3 (function select) of both devices 416 and 418 are connected to the respective (orderwise) four most significant lines of the 12 least significant lines of instruction bus 152 (lines designated 178-181). The input commonly designated M (mode control) of both devices 416 and 418 is connected to the thirteenth least significant line (182) of instruction bus 152; and, the input commonly designated inverse carry of device 418 is connected to the fourteenth least significant line (183) of the instruction bus. The inverse carry output of device 418 is connected by a line 422 to the inverse carry input of device 416; and, the inverse carry output of device 416 is connected to line 414.

The inputs of device 418 commonly designated A0-A3 are connected each to a respective one of the four lowest order lines of source bus 54; and, those of device 416 are connected each to a respective one (orderwise) of the four highest order lines of the source bus. Similarly, inputs of device 418 commonly designated B0-B3 are connected each to a respective one of the four lowest order lines of B bus 152; and, those of device 416 are connected each to a respective one (orderwise) of the four highest order lines of the B bus. The device outputs commonly designated F0-F3 are connected to device 420, those of device 418 each by a respective one of four lines collectively designated 424 and those of device 416 each by a respective one of four lines collectively designated 426.

Device 420 is connected to latch the state of each of the signals developed on the lines collectively designated 424 and 426 at the time designated by the latching signal developed on line 332 and to develop on the eight lines of bus 50 signals each having a respective one of the latched states, signals corresponding to those developed by device 418 are developed each on the respective one of the four lowest order lines of bus 50; and, signals corresponding to those developed by device 416 are developed each on the respective (orderwise) one of the four highest order lines of the bus.

It should be noted that device 420 is not required in embodiments employed in applications in which the resultant loss in processor 46 speed is not significant. In these embodiments, the F0–F3 outputs of devices 418 and 416 are directly connected to the corresponding lines of destination bus 50.

Condition testing circuitry 136, illustrated in FIG. 2D, ascertains the (binary) state of a selected one of a number of apparatus 10 component (hardware) conditions each of which is evidenced by a logic level potential developed by a component on a respective line (generally of control bus 50). Circuitry 136 is operative to develop on a line 500 a logic level potential the state of which corresponds to that developed on the selected condition line.

Preferably, circuitry 136 has a 74LS74 type flip-flop, designated herein 504, and a 74LS04 type inverter, designated herein 506, connected to develop a signal on line 508 by latching and inverting the inverse carry signal developed on line 414. Additionally, circuitry 136 has a pair of 74LS23 type 4-input NOR gates, designated herein 512 and 514, and a 74LS00 type 2-input NAND gate, designated herein 516, connected to develop on a line 518 a signal having a low logic level only when a low logic level potential is developed on each of the eight lines of destination bus 50. Further, circuitry 136 has a pair of 74LS151 type devices (data selector/multiplexer), designated herein 522 and 524, a 74LS04 type inverter, designated herein 526, and a 74LS32 type 2-input OR gate, designated herein 528. The three select inputs of both devices 522 and 524 are connected to the three highest order lines of the twelve lowest order lines of instruction bus 152 (lines designated 178–180). The enable input of device 524 is connected to the next higher order line (line 181) of instruction bus 152; and, the enable input of device 522 is coupled to the line by inverter 526. The data output of each of devices 522 and 524 is connected to a respective one of the two inputs of OR gate 528 the output of which is connected to line 500.

The five lowest order data inputs of device 522 are connected (in ascending order) to the lines of control bus 52 on which: the (cluster controller interface 40, portion 60) DP8340 device develops a transmitter register full signal; the DP8340 device develops a transmitter active signal; the (personal-computer interface 44, keyboard data byte latching) portion 66 flip-flop develops a signal indicating that a keyboard data byte is available; the second (interface 44, DMA latching) portion 68 flip-flop develops the data request signal; and the display memory 42 OR gate develops a signal indicating that a low logic potential is being developed on both of the two lowest order lines of the memory 12 internal address bus. The next higher order data input of device 522 is connected to line 518.

The two lowest order data inputs of device 524 are connected, respectively, to a high logic level potential and to line 508. The remaining six data inputs of device 524 are connected (in ascending order) to the lines of control bus 52 on which (cluster controller interface 40) portion 60 develops: the latched D10 signal; the latched D11 signal; a (EP8341 device generated) receiver error signal; a (DP8341 device generated) receiver data available signal; and a (DP8341 device generated) receiver active signal.

Source bus control register 140 designates (enables) the source of signals driving source bus 54. Preferably, register 140 has a 74LS04 type inverter, designated herein 540, a 74LS10 type 3-input NAND gate, designated herein 542, and a 74LS139 type device (2-to-4 line decoder/demultiplexer), designated herein 544. Device 544 is connected to develop a source bus 54 access (output) enabling signal on a line of control bus 52 selected by signals developed on the two lowest order lines of instruction bus 152 (the lines being designated 170 and 172), when enabled by a signal developed on a line 546 by the inverter and NAND gates (540 and 542). The three highest order outputs of the four data outputs of device 544 are connected (in ascending order) to lines of control bus 52 to develop: a signal to enable the output of the 74LS374 device of (personal computer interface 44, keyboard data byte latching) portion 66; the (cluster controller interface 40) portion 60, signal for reading the DP8341 register; and a signal to enable the outputs of the 74LS244 device of display memory 42.

Destination bus control register 138 designates the destination of signals driving destination bus 50. Preferably, register 138 has a 74LS138 type device (3-to-8 line decoder/demultiplexer), designated herein 550, and a 74LS04 type inverter, designated herein 552. Device 550 is connected to develop a destination bus 50 latching signal on a line of control bus 52 selected by signals developed on the three highest order lines of the eight lowest order lines of instruction bus 152 (lines 175–177) when enabled by a (high logic level potential) signal developed on (the active-low reset) line 232 and a (active-low) signal developed on line 334. The seven lowest order outputs of device 550 are connected (in ascending order) to lines of control bus 52 to develop: a personal computer, computer 12, interrupt request signal; a (cluster controller interface 40, portion 60) DP8340 device idle response signal; a (personal computer interface 44 DMA latching) portion 66, inverted driving signal (74LS374 device clocking signal); a DP8340 device register (transmit) loading signal; the B register latching (clocking) signal; a display memory 42 driving (L register clocking) signal; and another display memory 42 driving (H register clocking) signal.

Output register 140 is operative to develop (simultaneously) on each of a number of lines of control bus 52 (and the lines collectively designated 202) a logic level potential the (binary) state of which is (individually) controllable. Preferably, register 140 has a pair of devices of the type commonly designated DM9334 (bit registers), designated herein 570 and 572, a pair of 74LS00 type 2-input NAND gates, designated herein 574 and 576, and a 74LS04 type inverter, designated herein 578. The three address inputs of devices 570 and 572 are connected each to respective ones of the three lowest order lines of instruction bus 152 (lines designated 170-172); and, the data input of each of the devices is connected to the twelfth lowest order line of the bus (designated 181). The NAND gates and inverters (574, 576 and 578) are connected to develop signals for enabling a one of devices 570 and 572 selected by the state of the signal developed on (line 173) the fourth lowest order line of instruction bus 152. The three lowest order outputs of device 570 are connected each to a respective one of the three lines collectively designated 202 to develop signals forming a bank selecting portion of the signals used by multiplexer 100 when developing one of the two jump addresses, The remaining five device 570 outputs are connected to respective lines of control bus 52, the three lower order outputs for controlling (driving), respectively, the (cluster interface 40, portion 60) DP8340 device D10, D11 and parity inputs. The eight data outputs of device 570 are connected to respective lines of control bus 52, the first, third and fifth lowest order outputs for controlling (driving): the (cluster interface 40, portion 60) DP8340 device parity (even/odd "bar") input; DP8341 device (data/status "bar") output input; and (display memory 42) RAM device write input.

Following is the preferred processor 46 instruction format.

```
PROCESSOR 46   INSTRUCTION FORMAT 15            8 7             0
X X X X1X X X X1X X X X1X X X

NOTE: * = DON'T CARE

JMP INSTRUCTION:

OP   NOT  COND         ADDR
---  -  --------  ----------------
0 0  *   X1X X X X1X X X X1X X X

ALU INSTRUCTION:

OP       ALU OP     DEST    SOURCE
---  ------------  -----  ---------
0 1  X X1X X X X1  X X X  1X X X

ALU OP CODE BITS 8 -> 13

BIT 8  = S0       BIT 11 = S4

BIT 9  = S1       BIT 12 = M

BIT 10 = S3       BIT 13 = Cn

IMMEDIATE INSTRUCTION:

OP    ALU OP           DATA
---  ------------  ----------------
1 0  X X1X X X X1X X X X1X X X

REGISTER INSTRUCTION: ( T REG TRANSFER TO REG INSTRUCTION )

OP         DEST REG # IN REG FILE
-------                   --------
1 1 0 01* * * *1* * * 11X X X X

OP         DEST REG
-------         -----
1 1 0 01* * * *1X X X 01* * * *

BIT REGISTER INSTRUCTION:

OP  VALUE             BIT #
--------  -               -------
1 1 0 11X * * *1* * * *1X X X X
```

```
RETURN REG FILE:

OP                      REG #
  -------                  -------
  1 1 1 0 1|* * * *|* * * *|X X X X

JMP RECEIVER VECTOR:

OP
  -------
  1 1 1 1 1|* * * *|* * * *|* * * *
```

BIT REGISTER DEFINITIONS

| BITS 765 | REGISTER |
|---|---|
| 000 | T REGISTER ONLY ( RESULT ALWAYS IN T REG ) |
| 001 | H DISPLAY ADDRESS, 3 BITS * * * *|* X X X |
| 010 | L DISPLAY ADDRESS, 8 BITS |
| 011 | B REGISTER ( ACCUMULATOR ) |
| 100 | X REGISTER ( XMT REG ) |
| 101 | D REGISTER, DMA DATA INPUT REGISTER. WHEN USED AS DESTINATION IT INITIATES A SINGLE BYTE DMA TRANSFER. IT SHOULD NOT BE USED MORE OFTEN THAN EVERY 4 uSEC. |
| 110 | WHEN USED AS DESTINATION IT INITIATES AN INTERRUPT ON LEVEL 6 |

ALU SOURCE REGISTER DEFINITIONS

| BITS 4 3210 | USE |
|---|---|
| 0 0000 ↑ | |
|        | REGISTER FILE  0 - 15 |
| 0 1111 | |
| 1 0000 | DISPLAY RAM |
| 1 0001 | R REGISTER ( RECEIVER REGISTER ) |
| 1 0010 | K REGISTER ( KEYBOARD INPUT ) |
| 1 0011 | NOT USED |

BIT REGISTER DEFINITIONS

| BITS 3210 | VALUE | FUNCTION |
|---|---|---|
| 0000 | X | BANK SELECT BIT 0 ( LSB ) |

| | | |
|---|---|---|
| 0001 | X | BANK SELECT BIT 1 |
| 0010 | X | BANK SELECT BIT 2 ( MSB ) |
| 0011 | X | TRANSMIT DATA BIT 10 |
| 0100 | X | TRANSMIT DATA BIT 11 |
| 0101 | 0 | TRANSMIT DATA BIT 10 = PARITY |
| 0110 | | NOT USED |
| 0111 | | NOT USED |
| 1000 | 0 | TRANSMIT ODD PARITY |
| 1000 | 1 | TRANSMIT EVEN PARITY |
| 1001 | | NOT USED |
| 1010 | 0 | RECEIVER DATA = ERROR CODES |
| 1010 | 1 | RECEIVER DATA = DATA |
| 1011 | | NOT USED ( OLD DMA ) |
| 1100 | X | DISPLAY RAM WRITE, T REGISTER IS WRITTEN WHILE 1 AND MUST BE RESET BY THE PROCESSOR IN THE NEXT INSTRUCTION. |
| 1101 | | NOT USED |
| 1110 | | NOT USED |
| 1111 | | NOT USED |

JUMP INSTRUCTION CONDITION CODES

TRUE CONDITION: BIT 12 = 0

NOT TRUE CONDITION: BIT 12 = 1

| BITS 11-8 | TRUE CONDITION |
|---|---|
| 0000 | UNCONDITIONAL JUMP |
| 0001 | A = B |
| 0010 | CARRY = 1 |
| 0011 | RECEIVER BIT 10 = 1 |
| 0100 | RECEIVER BIT 11 = 1 |
| 0101 | RECEIVER ERROR |
| 0110 | RECEIVER DATA AVAILABLE |

| | |
|---|---|
| 0111 | RECEIVER ACTIVE |
| 1000 | TRANSMIT REGISTER FULL |
| 1001 | TRANSMITTER ACTIVE |
| 1010 | KEYBOARD HAD INPUT |
| 1011 | DMA REQUESTED  1, MAY BE IN SERVICE |
| 1100 | A0 AND A1 DISPLAY RAM ADDRESS = 0 |
| 1101 | T REGISTER = 0 ( NOT EQUAL TRUE ) |
| 1110 | NOT USED |
| 1111 | NOT USED |

Processor 46 executes each instruction in four machine cycles (periods) defined by signals developed by machine cycle generating circuitry 116. During the first machine cycle, designated T0 "bar", the previous address is incremented or the jump address loaded into program counter 100 to develop (on the lines collectively designated 240 signals representing) the next instruction address. Responsive to the instruction address (signals) program store 104 retrieves the addressed instruction and develops representative signals the states of which are latched by instruction register 106 which develops signals having the latched states on instruction bus 152. Instruction decoding circuitry 114 decodes the instruction (signals) and develops signals enabling the source specified in the instruction to drive source bus 54. B bus 150 is always driven by B register 124. Arithmetic logic unit (ALU) 128 performs the arithmetic or logic operation specified by the signals developed on instruction bus 152 on the operands represented by signals developed on source bus 54 and B bus 150 and develops signals representing the result for driving T register 130. After the signals have settled, during the third machine cycle, designated T2 "bar", T register 130 latches the states of the signals developed by ALU 128 and develops signals on destination bus 50 having the latched states. Finally, during the fourth machine cycle, designated T3 "bar", the states of the signals developed on destination bus 50 are latched by the destination register specified by the instruction.

Immediate buffer 108 develops the source bus 54 driving signals from the (lower order byte (8-bits) of the) instruction (signals) during the execution of immediate instructions and jump (on condition) instructions. For jump instructions, the immediate data byte is coupled (unaltered) by ALU 128, T register 130 and B register 124 onto B bus 150 to drive jump address multiplexer 100. Condition testing circuitry 136 and instruction decoding circuitry 114 ascertain the state of the (external hardware) condition specified by the instruction. Depending thereon, the jump is taken (the jump address is loaded into program counter 100) or not (the program counter is incremented). As a result, processor 46 executes a hardware indirect jump instruction.

After having read the preceding disclosure certain alterations and modifications of the present invention will no doubt become apparent to those skilled in the art. It is therefore intended that the following claims be interpreted to cover all such alterations and modifications as fall within the true spirit and scope of the invention.

We claim:
1. A processor comprising in combination:
an instruction bus;
a source bus;
a B bus;
a destination bus;
a program counter for developing signals representing an instruction address, said counter being responsive to a clocking signal and operative to increment said instruction address;
a program store storing a plurality of instructions, said program store being responsive to said address signals and operative to develop signals representing the addressed one of said instructions;
an instruction register responsive to a signal and operative to latch the state of each of said instruction signals and to develop on said instruction bus signals each having a respective one of said latched instruction signal states;
an arithmetic logic unit for performing the one of a plurality of operations specified by at least some of said instruction bus signals on signals developed on said source bus as a first operand and on signals developed on said B bus as a second operand to develop signals representing a result;
means for developing signals representing said result on said destination bus;
a B register responsive to a signal and operative to latch the state of each of said destination bus signals and to develop said B bus signals so each has a respective one of said latched destination bus signal states;
a register stack including a plurality of stack registers, said stack being responsive to a signal and operative to latch the state of each of said destination bus signals in the one of said stack registers addressed by at least some of said instruction bus signals and said stack being responsive to an output enabling signal and operative to develop said source bus signals so each has a respective one of said destination bus signal states latched in the one of said stack registers addressed by said some of said instruction bus signals;
circuitry for developing timing signals; and instruction decoding circuitry responsive to at least some of said instruction bus signals and operative to develop said program counter clocking signal, said instruction register latching signal, said B register latching signal, said stack latching signal, and said stack output enabling signal, each at a time designated by said timing signal developing circuitry.

2. A processor as recited in claim 1 further comprising a multiplexer for developing a first jump address from at least some of said B bus signals and for developing a second jump address from at least some of said source bus signals, said multiplexer being responsive to a signal and operative to select one of said first and said second jump addresses and wherein said program counter is further responsive to a loading signal and operative to set said instruction address to said selected jump address and wherein said instruction decoding circuitry is further responsive to said some of said instruction bus signals and operative to develop said multiplexer selecting signal and said program counter loading signal.

3. A processor as recited in claim 1 further comprising an immediate buffer responsive to an output enabling signal and operative to develop said source bus signals so each corresponds in state to that of a respective one of a like number of said instruction bus signals and wherein said instruction decoding circuitry is further responsive to said some of said instruction bus signals and operative to develop said immediate buffer output enabling signal.

4. A processor as recited in claim 1 further comprising a control bus including a plurality of lines and an output register for developing a plurality of signals each on a respective one of said control bus lines for controlling external circuitry, said output register being responsive to at least some of said instruction bus signals and operative to set the signal developed on the one of said control bus lines addressed by at least some of said instruction bus signals to a state indicated by at least one of said some of said instruction bus signals.

5. A processor as recited in claim 1 further comprising a control bus including a plurality of lines, means for developing a jump address from at least some of said B bus signals, and means for testing a plurality of external conditions each evidenced by the state of a signal externally developed on a respective one of said control bus lines, said testing means being responsive to the state of the signal developed on the one of said control bus lines addressed by at least some of said instruction bus signals and operative to develop a condition state signal and wherein said program counter is further responsive to a loading signal and operative to set said instruction address to said jump address and wherein said instruction decoding circuitry is further responsive to said some of said instruction bus signals and said condition state signal and operative to develop said program counter loading signal.

6. A processor as recited in claim 1 further comprising a control bus including a plurality of lines, a multiplexer for developing a first jump address from at least some of said B bus signals and for developing a second jump address from at least some of said source bus signals, said multiplexer being responsive to a signal and operative to select one of said first and said second jump addresses, and means for testing a plurality of external conditions each evidenced by the state of a signal externally developed on a respective one of said control bus lines, said testing means being responsive to the state of the signal developed on the one of the control bus lines addressed by at least some of said instruction bus signals and operative to develop a condition state signal and wherein said program counter is further responsive to a loading signal and operative to set said instruction address to said selected jump address, wherein said instruction decoding circuitry is further responsive to said some of said instruction bus signals and operative to develop said multiplexer selecting signal, and wherein said instruction decoding circuitry is further responsive to said some of said instruction bus signals and said condition state signal and operative to develop said program counter loading signal.

7. A processor as recited in claim 6 further comprising an immediate buffer responsive to an output enabling signal and operative to develop said source bus signals so each corresponds in state to that of a respective one of a like number of said instruction bus signals and wherein said instruction decoding circuitry is further responsive to said some of said instruction bus signals and operative to develop said immediate buffer output enabling signal.

8. A processor as recited in claim 7 further comprising an output register for developing a plurality of signals each on a respective one of said control bus lines for controlling external circuitry, said output register being responsive to at least some of said instruction bus signals and operative to set the signal developed on the one of said control bus lines addressed by at least some of said instruction bus signals to a state indicated by at least one of said some of said instruction bus signals.

9. An apparatus for interfacing a personal-computer to a 3270 compatible system, the apparatus comprising in combination:

a control bus including a plurality of lines;

a destination bus;

a source bus;

a system interface responsive to signals developed on said control bus and operative to develop a signal for transmission to the system representing encoded in 3270 serial-bit format a byte of data represented by signals developed in parallel format on said destination bus, to develop in parallel format on said source bus signals representing a byte of data encoded in said serial bit format and transmitted by said system, and to develop at least one system interface condition indicating signal on a respective one of said control bus lines;

a personal-computer interface responsive to signals developed on said control bus and operative to latch the state of signals developed on said destination bus for use by the personal-computer, to develop on said source bus signals developed by said personal-computer, and to develop at least one personal-computer interface condition indicating signal on a respective one of said control bus lines; and a processor including,
an instruction bus,
a B bus,
means for developing a jump address from at least some signals developed on said B bus,
a program counter for developing signals representing an instruction address, said counter being responsive to a clocking signal and operative to increment said instruction address and said counter being responsive to a loading signal and operative to set said instruction address to said jump address;

a program store storing a plurality of instructions, said store being responsive to said address signals and operative to develop signals representing the addressed one of said instructions, an instruction register responsive to a signal and operative to latch the state of each of said instruction signals and to develop on said instruction bus signals each having a respective one of said latched instruction signal states, an arithmetic logic unit for performing the one of a plurality of operations specified by at least some of said instruction bus signals on said source bus signals as a first operand and on signals developed on said B bus as a second operand to develop signals representing a result, means for developing said destination bus signals so as to represent said result, a B register responsive to a signal and operative to latch the state of each of said destination bus signals and to develop said B bus signals so each has a respective one of said latched destination bus signal states, a register stack having a plurality of stack registers, said stack being responsive to a signal and operative to latch the state of each of said destination bus signals in the one of said stack registers addressed by at least some of said instruction bus signals and said stack being responsive to an output enabling signal and operative to develop said source bus signals so each has a respective one of said destination bus signal states latched in the one of said stack registers addressed by said some of said instruction bus signals, an output register for developing said system interface and said personal-computer interface controlling control bus signals, said output register being responsive to at least some of said instruction bus signals and operative to set the signal developed on the one of said control bus lines addressed by at least some of said some of said instruction bus signals to a state indicated by at least one of said some of said instruction bus signals, testing means responsive to the state of the signal developed on the one of said control bus lines addressed by at least some of said instruction bus signals and operative to develop a condition state signal, circuitry for developing timing signals, and instruction decoding circuitry responsive to at least some of said instruction bus signals and said condition state signal and operative to develop said program counter clocking signal, said program counter loading signal, said instruction register latching signal, said B register latching signal, said stack latching signal, and said stack output enabling signal, each at a time designated by said timing signal developing circuitry.

10. An apparatus as recited in claim 9 wherein said processor further includes an immediate buffer responsive to an output enabling signal and operative to develop said source bus signals so each corresponds in state to that of a respective one of a like number of said instruction bus signals and wherein said instruction decoding circuitry is further responsive to said some of said instruction bus signals an operative to develop said immediate buffer output enabling signal.

* * * * *